(No Model.)
J. H. CAMPBELL.
VAPOR AND AMMONIA ENGINE.
No. 427,398. Patented May 6, 1890.
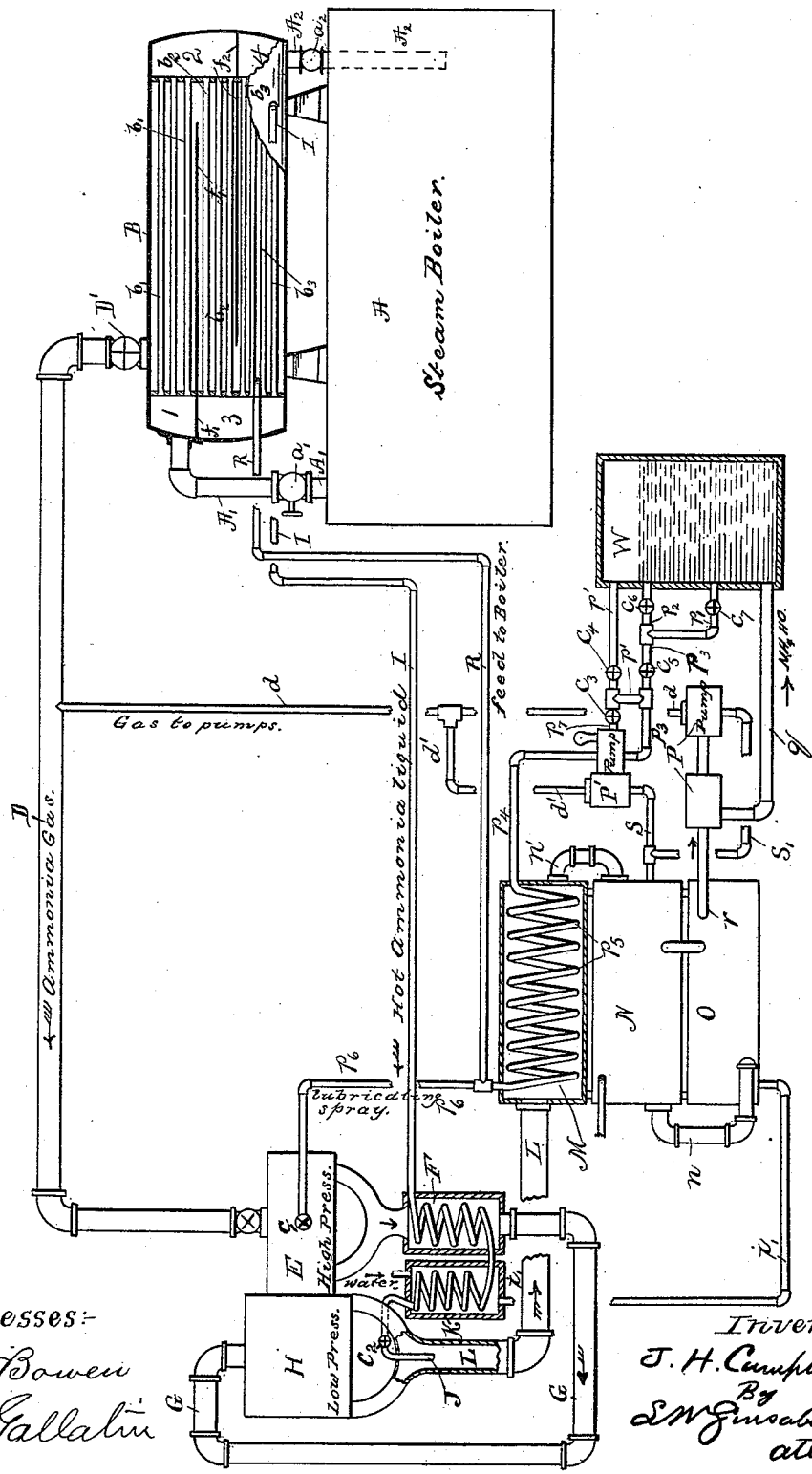
Witnesses:-
W. E. Bowen
D. R. Gallatin
Inventor
J. H. Campbell
By L. W. Ginsabaugh
atty

United States Patent Office.

JOSEPH H. CAMPBELL, OF NEW YORK, N. Y.

VAPOR AND AMMONIA ENGINE.

SPECIFICATION forming part of Letters Patent No. 427,398, dated May 6, 1890.

Application filed June 22, 1888. Renewed October 9, 1889. Serial No. 326,495. (No model.)

*To all whom it may concern:*

Be it known that I, JOSEPH H. CAMPBELL, a citizen of the United States of America, residing at New York, in the county of New York and State of New York, have invented certain new and useful Improvements in Vapor and Ammonia Engines, of which the following is a specification, reference being had therein to the accompanying drawings.

My invention relates to improvements in aqua-ammonia engines.

The objects of the invention are to expel the ammonia-gas from an ammoniacal solution and to superheat the expelled gas in the presence of the aqua-ammonia from which it had been expelled; to obtain proper circulation of steam when it is used as the heating agent for the purpose of expelling the gas from aqua-ammonia in a generator and superheating said gas and to obtain proper circulation in the generator of the gas so expelled; to increase at will the superheating-surface in the generator and correspondingly decrease the generating-surface therein, or to decrease said superheating-surface and correspondingly increase the generating-surface while using steam as heating agent, and to increase the temperature without in the same degree increasing the pressure or to increase the pressure without increasing the temperature; to utilize in operating a compound aqua-ammonia engine the heat originally contained in the absorbing-liquid drawn from the generator, so as to increase the efficiency of the low-pressure cylinder of said engine; to utilize the heat of absorption developed upon the union of exhaust-vapor and spraying liquid for the purpose of heating the feed-liquid; to relieve the suction-pipe of a pump constructed to deliver aqua-ammonia of any unabsorbed ammonia-gas that may be contained therein, and to remove the unabsorbed ammonia-gas from the delivery-valve of such pump.

My invention consists in heating aqua-ammonia by steam, passing the ammonia-gas so expelled through the cylinder of an engine, then cooling the same and absorbing it by liquid withdrawn from the generator, and returning the combined absorbing-liquid and exhaust-vapor to the generator, thereby condensing the steam used for heating the contents of the generator and draining the steam so condensed back into the steam-boiler.

My invention consists, further, in effecting a circulation of the steam used for heating the aqua-ammonia in the generator and superheating the gas expelled therefrom by so charging the generator and maintaining said charge that the proportions of heat required and imparted in one part of the generator will be so much greater than those required and imparted in another part thereof that condensation of steam is effected and consequently circulation obtained.

My invention consists, further, in the method of superheating the vapor which has passed through the high-pressure cylinder of a compound engine and before it enters the low-pressure cylinder by imparting to it heat contained in the spraying liquid, which is afterward to be used for absorbing the exhaust-vapor of the engine.

My invention consists, further, in the method of imparting the heat of absorption evolved, owing to the contact of spraying liquid and exhaust-vapor to the feed-liquid before it re-enters the boiler.

My invention consists, further, in withdrawing through suitable pipes unabsorbed gas contained in a pump delivering aqua-ammonia and in its suction-pipe to the vapor-space of the well.

In the drawings I have shown a side elevation, partly in section, of the devices which embody my invention.

A is a steam-boiler of ordinary construction.

B is a secondary boiler, wherein aqua-ammonia is heated by water-steam. It is so arranged that the water-steam generated in boiler A enters it through connection A when the gate-valve $a'$ therein is open, and after circulating through its tubes will be drained back into the steam-boiler. This secondary boiler B will hereinafter be termed the "generator," and is provided with tubes above and below the liquid-line, and with chambers 1, 2, 3, and 4 at its ends, and is so constructed that the steam entering chamber 1 through connection A' will pass through the tubes $b'$ $b'$ to chamber 2, then through tubes $b^2$ $b^2$ to chamber 3, and from there through tubes $b^3$ $b^3$ to chamber 4, from where it is drained back through connection $A^2$ into the boiler.

$a'$ is a gate-valve for controlling the admission of steam to the generator, while $a^2$ is a check-valve opening downward.

The lower tubes of the generator are surrounded by aqua-ammonia.

$f'$ and $f^2$ are horizontal division-plates to prevent the conveying of water with the vapor to the engine and to cause the gas to travel over the heated tubes in the vapor-space in a direction opposite to that taken by the steam while passing through the tubes, that the vapor may become superheated. In most cases the use of only one such plate will be sufficient. Steam having been generated in the boiler A, as the valve $a'$ is opened and the steam passes through generator B, as indicated above, it will be observed that while first going through the tubes in the vapor-space it will readily superheat the vapor in the upper part of the generator, but that in passing finally through the tubes in the lower or liquid space, the requirement of heat there being much greater, a portion of the steam will be condensed and a circulation of steam will be effected in this direction until the temperature in this part of the generator is as high as that in the upper part; but this is prevented and the circulation maintained continuously by drawing off the liquid that has been so heated and deprived of its gas, cooling the same and recharging it with gas exhausted from the engine, and returning the same so enriched and at a temperature lower than that maintained in the generator by means of a pump to this part of the generator.

The gas expelled from the solution is directed by the division-plates $f^2$ $f'$ longitudinally along and over the hot tubes in the upper portion of the generator in a direction opposite to that followed by the steam in the tubes $b'$ $b'$ $b^2$ $b^2$ $b^3$ $b^3$. The vapor will thus be superheated, and any liquid carried along with the gas will be vaporized before leaving the generator for use in the engine-cylinder.

The check-valve $a^2$ in pipe $A^2$ is to prevent the liquid from being forced out of the boiler into the generator when the valve $a'$ is closed, said pipe $A^2$ reaching into the liquid-space of steam-boiler A.

D is the vapor-pipe for supplying vapor to the cylinder of the engine, and in compound engines, as in this case, to the high-pressure cylinder E, from which the exhaust-vapor is discharged into the reservoir F, and from which it passes through the pipe G into the low-pressure cylinder H, and, having performed its work there, is discharged into pipe L.

I is a pipe conveying the absorbing-liquid from the generator B to the exhaust-pipe of cylinder H, where it discharges the liquid by means of the jet J. $C^2$ is a cock for regulating the discharge through said jet J. Said pipe I is made to pass through reservoir F in form of a coil. It there imparts heat to the vapor which has just left cylinder E, where it has lost part of its heat, owing to its expansion therein. From reservoir F the spraying-pipe I passes again in the form of a coil through reservoir K, where it is further reduced in temperature by cooling-water surrounding said coil. The combined spraying liquid and exhaust-vapor pass through exhaust-pipe L into chamber M, acting as a heater for the feed-liquid, as hereinafter described, and constructed as a surface-condenser. After passing around the coiled pipe $p^5$ of said heater it enters the surface-condenser N through pipe $n'$, and after having circulated through the same the mixture is discharged by means of pipe $n$ into the lower part of the absorber O. The pump P then withdraws it from there through the pipe $r$, and delivers it through pipe $q$ into well W, where the liquid may be cooled further to secure absorption.

$d$ is the pipe supplying the vapor for operating the pump P. The feed-pump $P'$ takes its liquid from the well either through pipe $p'$ or pipe $p^2$, but in either case through pipe $p^3$, and discharges the same through pipe $p^4$ into coil $p^5$ within the chamber M. It receives its supply of vapor from pipe $d'$, connecting with pipe $d$, which obtains its supply of vapor from pipe D.

Owing to the cooling process to which the combined spraying liquid and exhaust-vapor must be subjected in surface-condenser N and absorber O in order to help along absorption, the mixture reaches the well at a low temperature, and is therefore capable, after having passed through feed-pump $P'$, of serving as a cooling medium for the combined spraying liquid and exhaust-vapor in heater M. While gas will thus again be set free in said cooling-liquid, this is not objectionable, as from heater M said liquid, and with it any free gas, will pass directly into the generator B through the feed-pipe R. By thus transferring in heater M heat of absorption evolved around said coil $m$ to the feed-liquor within said coil two advantages are gained—viz., economy in fuel as well as in cooling-water.

The object of providing two suction-pipes $p'$ and $p^2$ for feed-pump $P'$ and letting said suction-pipes enter well W at different elevations is to increase or decrease at the will of the operator the superheating-surface in the generator and at the same time correspondingly decrease or increase the generating-surface therein. The quantity of the liquid used throughout the apparatus being practically always the same, it will be seen that the amounts of it in the well and the generator may by this contrivance be varied according to the requirements of the engine—for example, by closing cock $c^7$ in pipe $p'$ and opening $c^6$ in pipe $p^2$ and permitting the well to fill up to said pipe $p^2$, and to that extent to deplete the generator of liquid, thus exposing additional tubes in the generator previously covered by liquid. Thus the generating-surface is decreased and the superheating-surface is increased correspondingly. If the opposite result be desired, it may be readily effected by closing cock $c^6$ and opening cock $c^7$. It will be also understood that by the above manipulation the operator can increase the temperature of the vapor in the generator without at the same time increasing the pressure in like degree, or he can increase the pressure without increasing the temperature, for in ten cubic feet of the ammoniacal solution there is double the quantity of gas that there is in five cubic feet, and at the same pressure there will be twice as much gas expelled from the ten cubic feet as from the five at the same temperature. It follows, therefore, that the greater the quantity of the ammoniacal solution in the generator the higher the pressure at a given temperature, and consequently the less the quantity of liquid in the generator the higher the temperature for a given pressure.

I have found in practice that it frequently occurs that the pipe $p'$, which leads from the feed-pump to the well, becomes charged with gas on account of the liquid in the well falling below the point where pipe $p'$ enters the well, cock $c^6$ then being closed and cock $c^7$ being open and again rising above it, thus imprisoning the gas in said pipe $p'$. As the feed-pump is not designed for pumping vapor, its action is thus retarded and it will fail to supply the boiler with the necessary feed-liquor. To guard against this the pipe $p'$ is run from a point in the suction-pipe $p^3$ near the feed-pump to the upper or vapor space of the well W. This permits of the gas that may be withdrawn from well W through pipe $p'$ re-entering said well through pipe $p'$, thus giving to pump P' an uninterrupted supply of feed-liquor.

To relieve the pump from gas on the delivery side of the discharge-valve, which gas would act in the same manner as imprisoned air acts in a water-pump, the pipe $p'$ is likewise connected with the pump on its delivery side at the point where the air is usually allowed to escape from a water-pump. In said connection to the pump is placed the cock $C^3$, which is operated precisely as an air-cock in the corresponding part of a water-pump. The cock $C^4$ in pipe $p'$ is usually kept open and is only closed when repairs or changes in said pipe become necessary.

$P^6$ is a branch pipe leading from the main boiler-feed pipe R into the interior of the cylinder E. The same withdraws feed-liquid from pipe R after such liquid has passed through the heater M, and as the lubricant is thus introduced into the cylinder heated no chilling of the vapor propelling the piston and of the walls of the cylinder will occur.

I have found from experience that when it becomes necessary to inject aqua-ammonia into the cylinder and valve-chest for the purpose of lubricating the same it is preferable to use a strong solution forced into the cylinder under a pressure somewhat exceeding that generated in the boiler containing the aqua-ammonia—such as would be produced by the feed-pump—and I therefore withdraw the fluid for such purpose from pipe R, as the combined spraying liquid and exhaust-vapor passing through said pipe are much stronger than the spraying liquid contained in pipe I.

While it may be common to inject lubricants into the cylinders of engines, the efficacy of the methods employed heretofore I believe to be inferior to my present method. Should a separate pump be employed for this purpose, this would require extra care. Should boiler-pressure be used instead, no liquid would enter the cylinder at the time when most needed—viz., prior to the cut off—since the same pressure would exist in the steam-chest as in the generator, and the friction occurring in the liquid-pipe would be much greater than that in the steam-pipe.

In using the feed-pump for forcing the lubricant into the engine-cylinder and the valve-chest a pressure is imparted to the lubricant greater than boiler-pressure, and it will therefore be possible at all times to so convey the aqua-ammonia used as a lubricant into said cylinder and valve-chest whether the valve is moving or not. $C'$ is the cock for regulating the discharge of said lubricating-liquid into the cylinder.

For the purpose of regulating the pressure in the generator it can readily be provided with any of the well-known appliances whereby a pressure in the generator will operate a damper in the smoke-stack.

To prevent an excess of pressure in the generator, the steam-boiler may be provided with a safety-valve set to open when a certain pressure is attained either in the generator or in the boiler.

I claim as new and desire to secure by Letters Patent—

1. The method herein described of operating an aqua-ammonia engine, the same consisting in passing steam from a steam-boiler directly through the tubes of a superheating-chamber of a generator, causing it afterward to circulate through tubes in the liquid-space of said generator, expelling by the heat of such steam ammonia-gas from aqua-ammonia surrounding said tubes, then conveying said gas to the cylinder of an engine for the purpose of propelling its piston, afterward exhausting said gas and bringing it in contact with weak solution withdrawn from the generator, cooling the combined gas and solution, returning the same to the liquid-space of the generator, and causing the steam condensed thereby to return to the steam-boiler, substantially as set forth.

2. In an aqua-ammonia engine, the method herein described of effecting circulation of steam used as heating agent in the generator, the same consisting in passing the steam from a steam-boiler through tubes of the generator communicating with each other, part of said tubes being surrounded by vapor and part of the same being surrounded by liquid, thus expelling ammonia-gas and superheating it by the heat of the steam, then withdrawing and cooling said gas and withdrawing weak hot solution from said generator, resaturating it with the gas so drawn from the vapor-space of the generator, and forcing this resaturated solution back into the generator, thus effecting condensation of the steam in the tubes surrounded by liquid prior to draining said condensed steam back from there into the boiler through a pipe extending into its liquid-space, substantially as set forth.

3. The method herein described of operating an aqua-ammonia engine, the same consisting in passing the steam from a steam-boiler through tubes of the generator communicating with each other, part of said tubes being surrounded by vapor and part of the same being surrounded by liquid, thus expelling ammonia-gas and superheating it by the heat of the steam, then conveying said gas to the cylinder of an engine, cooling it by working it expansively, exhausting the same, bringing the exhaust-vapor in contact with weak solution drawn from the generator, cooling the combined vapor and solution, returning the same to the liquid part of the generator, and causing the steam condensed thereby to return to the steam-boiler, substantially as set forth.

4. The method herein described of preventing the entraining of liquid and of promoting the heating and superheating of the gases expelled from the liquid in an ammonia-generator, the same consisting in inserting in said generator a horizontal or lateral diaphragm extending over part of the vapor-space in said generator for the purpose of compelling lateral motion of the gases in said generator, substantially as set forth.

5. The method herein described of preventing the entraining of liquid and of promoting the heating and superheating of the gases expelled from the liquid in an ammonia-generator having double heads at its ends and tubes connecting the same, said method consisting in subdividing the end chambers by inserting therein diaphragms having directions corresponding with that of the tubes aforesaid and in inserting a lateral diaphragm in the central part of said generator, but extending it only from a side wall of the vapor-space across part of its width for the purpose of changing the direction of the steam for heating the contents of the generator while circulating through the same and of compelling circulation of the ammonia-vapor in a direction different from that taken by the steam while passing through said tubes, substantially as set forth.

6. The method herein described of increasing the generating-surface in an aqua-ammonia generator and decreasing the superheating-surface therein, which consists in drawing off liquid from the generator and storing the same in a well or reservoir, thus exposing an increased heating-surface for superheating the vapor, and then heating the contents of the generator and superheating the vapor therein by means of steam circulating in a downward direction through tubes in said generator, substantially as set forth.

7. The method herein described of utilizing heat of the spraying liquid withdrawn from the boiler of a compound aqua-ammonia engine, which consists in heating the vapor in an intermediate chamber between the high and low pressure cylinders by hot weak solution drawn from the boiler for spraying the exhaust-vapor, substantially as set forth.

8. The method herein described of utilizing heat of absorption evolved in an aqua-ammonia engine for the purpose of heating the feed-liquid, which consists in bringing the cooled weak solution and the exhaust of the engine in contact with each other, and thus generating heat of absorption and causing the same to pass around a coil containing the feed-liquid after it has passed through the feed-pump on its way to the generator, and thus heating said feed-liquid, substantially as set forth.

9. The method herein described of cooling the combined spraying liquid and exhaust-vapor of an aqua-ammonia engine, which consists in passing the same through a surface-condenser on its way to the feed-pump and using the saturated liquid as a cooling medium within said surface-condenser while passing said saturated liquid from the feed-pump to the generator, substantially as set forth.

10. The method herein described of relieving the suction-pipe of an aqua-ammonia pump of gas by passing said gas back into the vapor-space of the well from which the liquid was drawn by means of a pipe connecting said vapor-space of the well with the part of the suction-pipe near said pump and constructed to drain to the pump, substantially as set forth.

11. The method herein described of relieving an aqua-ammonia pump of gas by passing said gas from the chest containing the delivery-valve of said pump back into the vapor-space of the well from which the liquid was drawn by means of a pipe connecting said vapor-space of the well with said valve-chest, and constructed to drain to said valve-chest, substantially as set forth.

In testimony whereof I affix my signature in presence of two witnesses.

JOSEPH H. CAMPBELL.

Witnesses:
C. L. HORACK,
JAMES McLAIN.